J. E. MAYHALL.
DIRECTION INDICATOR.
APPLICATION FILED OCT. 30, 1919.
1,351,671.
Patented Aug. 31, 1920.
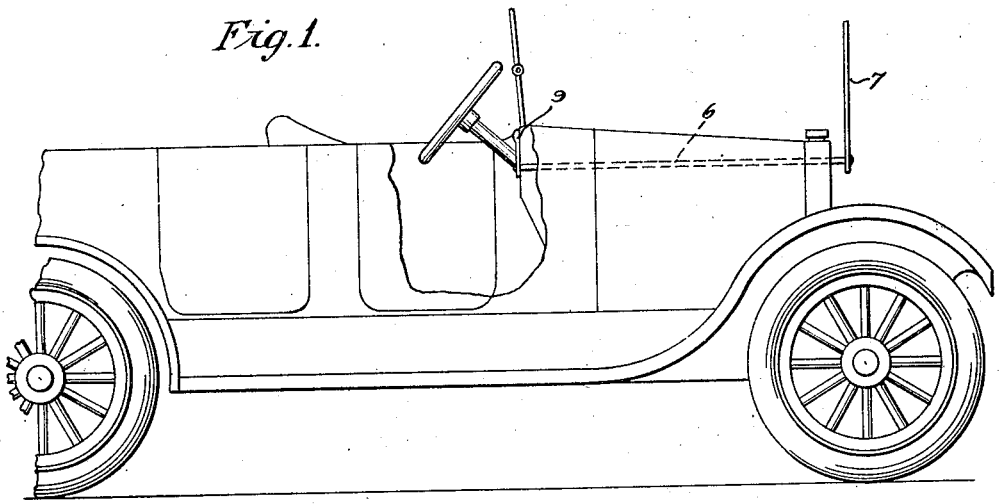
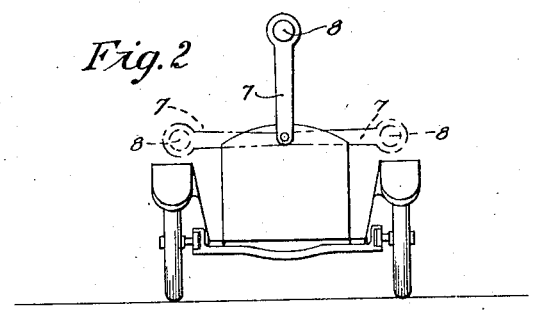
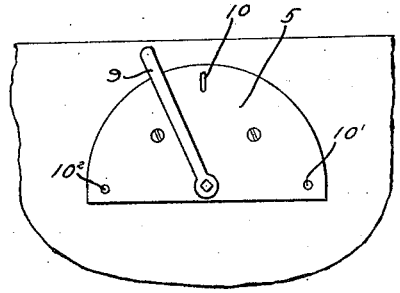
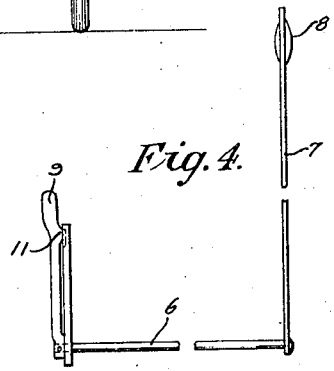
WITNESSES
INVENTOR
J. E. Mayhall.
BY
ATTORNEYS

UNITED STATES PATENT OFFICE.

JAMES ELMER MAYHALL, OF COVINGTON, KENTUCKY.

DIRECTION-INDICATOR.

1,351,671.  Specification of Letters Patent.  Patented Aug. 31, 1920.

Application filed October 30, 1919. Serial No. 334,393.

*To all whom it may concern:*

Be it known that I, JAMES E. MAYHALL, a citizen of the United States, and a resident of Covington, county of Kenton, State of Kentucky, have invented a new and useful Direction-Indicator, of which the following is a full, clear, and exact description.

The present invention relates to direction indicators and has reference more particularly to that class of indicators which are used on road vehicles, to indicate to an approaching vehicle the direction to be taken by the vehicle on which the indicator is installed.

The primary object of the invention is to provide a convenient means for facilitating driving a vehicle preferably a motor vehicle in a congested city or in fact anywhere it is desirable to give a warning to a vehicle either approaching from the front or rear, the direction which the vehicle on which the device is installed is to take.

A further object of the invention is to provide a device of the character described which may be manufactured and installed on a vehicle at a moderate cost and at the same time being capable of carrying out its intended use to the greatest efficiency.

A still further object of the invention is to so construct the device and install it upon the vehicle that it may be conveniently operated by the chauffeur.

With this and other objects in view the invention will be more readily understood upon reference to the accompanying drawing in which, Figure 1 is a side view of a conventional type of motor vehicle of the pleasure type illustrating the application of the invention.

Fig. 2 is a front view of the vehicle illustrating the different indicating positions of the device.

Fig. 3 is an enlarged view of a part of the dash or instrument board of a vehicle showing the installation thereon of the operating means for the device, and Fig. 4 is a side view of the device apart from the vehicle.

Referring to the drawings in detail, the invention will be described, as it is illustrated, in connection with a pleasure motor vehicle of a conventional type, which has the usual steering wheel, chauffeur seat and instrument board on the dash. The invention in its preferred form comprises a plate 5 which may be constructed of any suitable material and secured to the instrument board, or in any other convenient place near the driver's seat of the vehicle. Passing through the plate 5 and extending longitudinally of the hood of the vehicle is a horizontal rod 6, one end of which terminating beyond the radiator of the automobile, and with the opposite end terminating slightly beyond the plate 5. Mounted upon the rod 6 is an indicator arm 7, which is of sufficient height to enable the colored lens 8 to be readily observed at either the front or rear of the vehicle. An operating handle 9 on the end of the rod 6 adjacent to plate 5 may be employed to swing the arm 7 to one of three positions. For instance the arm when presented vertically will indicate ordinary running position, whereas should the arm be shown to the right in a horizontal position as shown in Fig. 2, it would indicate that the vehicle would take a turn to the right. Likewise if the arm were shown in a horizontal position to the left it would indicate that the vehicle was about to make a left hand turn. As stated, the lever 9 is employed for manipulating the arm 7, and in order that the arm may be maintained in vertical or ordinary running position, the plate is provided with a slot 10, made to receive the tongue 11 on the lever 9. Stop pins $10^1$ and $10^2$ are arranged on opposite sides of the plate to limit the movement of the lever in either one of the horizontal positions of the arm. The lever 9 may be made of some spring metal in order to maintain the tongue in the slot 10.

The device practically comprises four parts, namely, the indicating arm 7, the rod 6, the lever 9, and the plate 5 all of which may be manufactured exceedingly cheap and easily installed on a vehicle. The lens 8 may be of any desired colored glass except red, set in any opening in the end of the arm made to receive the same.

Instead of supporting the arm 7 on the front of the vehicle it may be supported at the rear; in which event the plate 5 will be preferably mounted on the front side of the seat with the rod 6 extending rearwardly of the vehicle. The arm 7 may also be wired and made to support a light source behind the lens 8.

Having thus described my invention what I claim as new and desire to secure by Letters Patent is as follows:—

The combination with a vertical support;

of a semi-circular plate mounted on the support with the convex edge thereof disposed uppermost, said plate having an opening at the axis thereof and a vertical slot above said opening near the convex edge, stop pins projecting from the face of the plate near the extremities of the convex edge, a shaft having bearing in the opening and adapted to support an arm at its opposite end for bearing a signal or the like, and a lever fixed to the shaft at the end thereof projecting through the plate and extending in juxtaposition to the face of the plate and beyond the convex edge thereof to form a handle, said handle being offset and having a projecting prong combining with the resiliency of the lever to engage in the slot automatically for maintaining said shaft and the arm in a fixed position, said pins serving to limit the swing of the lever, substantially as and for the purposes set forth.

JAMES ELMER MAYHALL.